United States Patent
Guillot et al.

(10) Patent No.: US 10,716,081 B2
(45) Date of Patent: Jul. 14, 2020

(54) SYSTEM FOR PROCESSING SIGNALS FROM AN EMITTER FOR THE PURPOSE OF DATING THE SIGNALS AND LOCATING THE EMITTER, AND ASSOCIATED RECEIVING STATION

(71) Applicant: Zodiac Data Systems, Courtaboeuf (FR)

(72) Inventors: Baptiste Guillot, Fresney le Puceux (FR); Frederic Saffre, Saint Andre sur Orne (FR); Yann Picard, Caen (FR)

(73) Assignee: Zodiac Data Systems (FR)

( * ) Notice: Subject to any disclaimer, the term of this patent is extended or adjusted under 35 U.S.C. 154(b) by 343 days.

(21) Appl. No.: 15/569,702

(22) PCT Filed: Apr. 27, 2016

(86) PCT No.: PCT/EP2016/059340
§ 371 (c)(1),
(2) Date: Oct. 26, 2017

(87) PCT Pub. No.: WO2016/174054
PCT Pub. Date: Nov. 3, 2016

(65) Prior Publication Data
US 2018/0132201 A1    May 10, 2018

(30) Foreign Application Priority Data

Apr. 27, 2015  (FR) .................................. 15 53761

(51) Int. Cl.
*H04W 56/00*   (2009.01)
*G01S 5/02*    (2010.01)
*G01S 5/06*    (2006.01)

(52) U.S. Cl.
CPC ......... *H04W 56/006* (2013.01); *G01S 5/0221* (2013.01); *G01S 5/06* (2013.01)

(58) Field of Classification Search
CPC ... H04W 56/004; H04B 7/086; H04B 7/0854; H04B 7/08; H01Q 3/2605; H01Q 3/2611; G01S 5/0221; G01S 5/06
(Continued)

(56) References Cited

U.S. PATENT DOCUMENTS

2011/0285589 A1* 11/2011 Bull ................... G01S 5/0242
                                                   342/387
2012/0059578 A1*  3/2012 Venkatraman ......... G01C 21/20
                                                    701/411

FOREIGN PATENT DOCUMENTS

| EP | 0733912 A2 | 9/1996 |
| WO | 0957575 A2 | 11/1999 |
| WO | 2004059338 A2 | 7/2004 |

OTHER PUBLICATIONS

International Search Report from Application No. PCT/EP2016/059340, dated Sep. 27, 2016.

* cited by examiner

Primary Examiner — Harry K Liu
(74) Attorney, Agent, or Firm — Lerner, David, Littenberg, Krumholz & Mentlik, LLP

(57) ABSTRACT

The invention relates to a receiving station (1x) of a system for processing signals originating from an emitter, comprising: a first receiver (3) configured to acquire signals from the emitter; and a second receiver (4) configured to acquire signals from a satellite navigation system. The station is characterised in that the first receiver (3) and the second receiver (4) are synchronised by the same local clock (6) generating a local time base, the acquired signals being dated by said time base.

14 Claims, 2 Drawing Sheets

(58) Field of Classification Search
USPC .......................................................... 342/387
See application file for complete search history.

SYSTEM FOR PROCESSING SIGNALS FROM AN EMITTER FOR THE PURPOSE OF DATING THE SIGNALS AND LOCATING THE EMITTER, AND ASSOCIATED RECEIVING STATION

CROSS REFERENCE TO RELATED APPLICATIONS

The present application is a national phase entry under 35 U.S.C. § 371 of International Application No. PCT/EP2016/059340 filed Apr. 27, 2016, which claims priority from French Patent Application No. 1553761 filed Apr. 27, 2015, the disclosures of which are incorporated herein by reference.

GENERAL TECHNICAL FIELD

The invention relates to fine-tuned time synchronisation of systems receiving geographically remote signals. In particular, the invention applies to the field of transmitter localisation and more specifically relates to a system for processing signals from a transmitter for the purpose of fine-tuned timing of these signals to locate said transmitter. The invention can be applied without limitation to applications such as angle measurement, direction finding, or Multiple-Input Multiple-Output (MIMO) systems or Single-Input Multiple-Output (SIMO) systems that seek to operate a plurality of sensors to increase signal reception quality.

More generally, the invention relates to systems provided with a plurality of sensors and dedicated to reception, analysis and utilisation of signals, using for this purpose the diverse properties of one same signal such as perceived at geographically different locations. In particular, said systems contain a signal processing sub-system allowing the fine-tuned timing of these signals so that it is possible to take adequate advantages of the above-mentioned diversity of properties.

STATE OF THE ART

For precise remote locating of an object transmitting or sending a signal, one of the main methods used requires the fine-tuned measurement of the difference between the time of reception of one some portion of this signal received at several locations.

To measure Time Differences of Arrival (TDOA) and Frequency Differences of Arrival (FDOA), these timed signal portions are transmitted then compared by time and frequency correlation in a common processing unit. In one known fine-tuned timing technique, signals arriving from the object to be located are received with a synchronised receiver system by a signal receiver of a GNSS system (Global Navigation Satellite System) such as GPS, Glonass, Galileo or Beidu for example. These signal receivers of a satellite navigation system transmit their time base. This time base, synchronised with the signals of a satellite navigation system, is transmitted to the other signal receivers which in turn use this base to time the recordings of signals of interest.

This technique integrates several errors in transmission of the time base, which cause an absolute timing error.

PRESENTATION OF THE INVENTION

With the invention, it is possible to improve the timing accuracy of signals received at several locations.

The invention advantageously allows the locating of a transmitter by means of recordings, at multiple sites, of signals from this transmitter.

Time errors are generally independent of one another, and in particular cannot offset one another in the event of differential synchronisation (i.e. in the case where it is the timing difference that is of essential importance, in particular for transmitter locating applications).

In a first aspect, the invention relates to a receiving station of a system for processing signals from a transmitter, comprising a first receiver configured to acquire signals from the transmitter; a second receiver configured to acquire signals received from a satellite navigation system; the station being characterized in that the first receiver and the second receiver are synchronised by one same local clock generating a local time base, the acquired signals being timed by said time base.

The receiver station, in the first aspect of the invention is advantageously completed by the following characteristics taken alone or in any technically possible combination thereof:

The second receiver is further configured to demodulate signals received from the satellite navigation system, to extract the absolute time base therefrom and then to determine the difference between this time base and each local time base so as to resynchronise the signals from the transmitter in relation to said absolute time base.

The first receiver is configured so that, from the difference between the absolute time base and the local time base, it times the signals from the transmitter in relation to the absolute time base.

The first receiver is configured to acquire portions of signals from the transmitter during a predefined period in the absolute time base, and to transmit these to a processing station together with the times or timing differences of said portions in the local and absolute time bases.

The satellite navigation system comprises at least one satellite constellation, each constellation comprising a plurality of satellites, the second receiver is configured to select in autonomous or supervised mode at least one satellite among the plurality of satellites of one of the constituent constellations of the satellite navigation system, the signals acquired by the second receiver being received from the selected satellite(s).

Selection, in autonomous mode, consists of selecting at least one satellite having an elevation higher than a threshold value, in a visible constellation.

The second receiver is configured to generate a reception quality indicator of signals received from a satellite in a visible constellation, the selection in autonomous mode consisting of selecting at least one satellite for which the quality indicator is higher than a threshold value.

The second receiver is configured to receive information, in supervised mode, on the selection of a satellite sent by a processing station.

The second receiver is configured to generate a reception quality indicator of signals received from one or more satellite(s) in a visible constellation, the quality indicator being transmitted to the processing station, the information on selection of one or more satellite(s) being determined from this quality indicator.

In a second aspect, the invention relates to a system for processing signals from a transmitter, comprising: at least two receiver stations according to the first aspect of the invention and a processing station configured to process signals transmitted and timed by the receiver stations.

The processing system according to the second aspect of the invention is advantageously completed by the following characteristics taken alone or in any technically possible combination:

The processing station comprises a processing unit configured to compute arrival differences in time and/or frequency between portions of identical signals from the transmitter.

The processing unit is further configured so that, from the computed arrival differences, it can determine a location of the transmitter from which the acquired signals were received.

The second receiver of each of the receiver stations is configured to select, in autonomous mode, at least one satellite within the visibility of each of the stations at an elevation higher than a threshold value.

The processing station is one of the receiver stations.

DESCRIPTION OF THE FIGURES

Other characteristics, objectives and advantages of the invention will become apparent from the following description that is solely illustrative and non-limiting, and is to be read in connection with the appended drawings in which.

In all the Figures similar parts carry the same references.

DETAILED DESCRIPTION OF THE INVENTION

Figure 1:
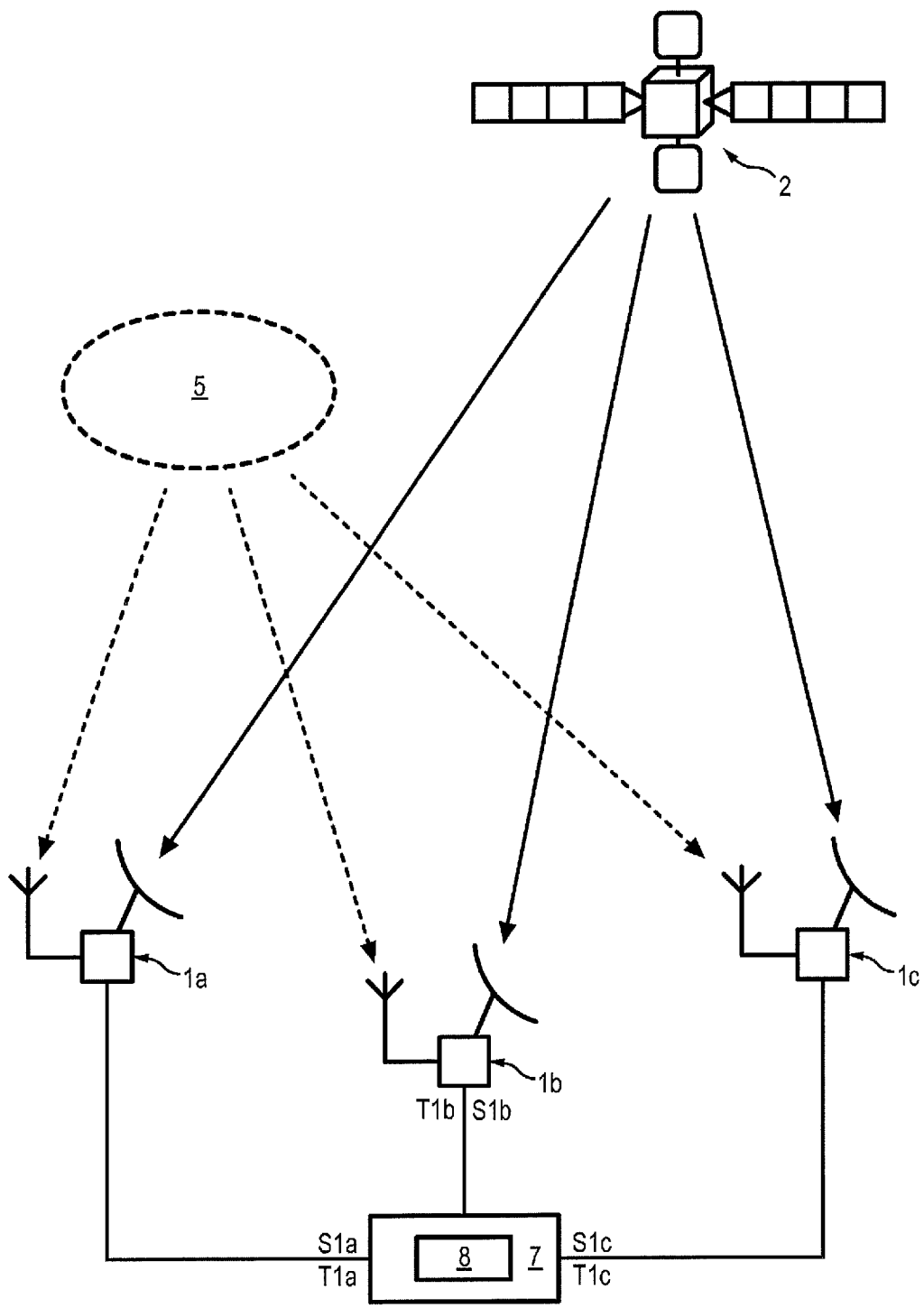
FIG. 1 illustrates a system for processing remote signals from one same transmitter.

With regard to FIG. 1, a system for processing signals from a transmitter 2 comprises at least two receiver stations configured to acquire signals first from transmitter 2 and secondly signals received from one or more satellite navigation systems 5 known as « GNSS » systems (e.g. GPS, Glonass or Galileo). In FIG. 1, three remote stations are illustrated 1a, 1b, 1c. Transmitter 2 is typically a satellite that it is desired to locate, but it may be an aircraft or land transmitter such as a mobile terminal.

The processing system further comprises a processing station 7 configured to receive signals $S_{1a}$, $S_{1b}$, $S_{1c}$ and their respective timings $T_{1a}$, $T_{1b}$, $T_{1c}$ sent by the receiver stations 1a, 1b, 1c. The processing station 7 particularly allows the locating of transmitter 2. Other applications requiring synchronisation are possible.

Advantageously, the processing station 7 may be included in one of the receiver stations 1a, 1b, 1c.

Figure 2:
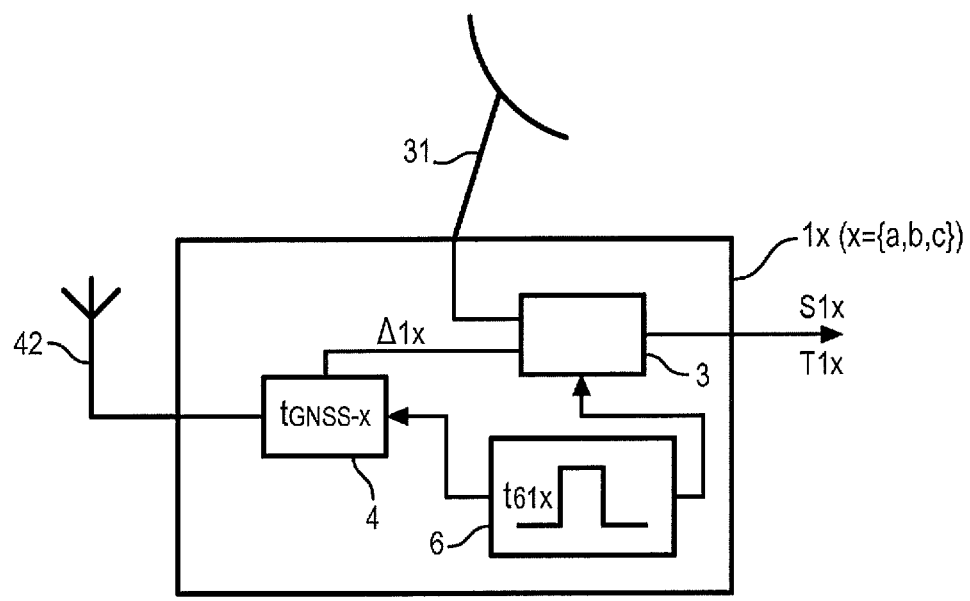
FIG. 2 illustrates a receiver station of a system for processing remote signals from a transmitter according to the invention.

With reference to FIG. 2, each receiver station 1x (x=a or b or c) comprises a first receiver 3 configured to acquire signals from transmitter 2 and a second receiver 4 configured to acquire signals from the satellite navigation system 5 (hereafter GNSS signals).

The first receiver 3 is connected to first antenna 31 and the second receiver 4 is connected to a second antenna 42. The first and second receivers 3, 4 may advantageously be positioned in one same package ensuring the functions of receivers 3, 4 respectively.

The first receiver 3 and the second receiver 4 of each of the receiver stations 1x are synchronised and timed by one same local clock 6x locally generated in each of the receiver stations 1x. It is further noted that the local clocks 6x of each receiver station 1x are not synchronised with one another.

It is specified here that by "local clock" it is meant to designate a unit which allows the triggering and synchronisation of the sampling of acquisitions by the first and second receivers 3, 4 and which provides common timing (time reference) of the constituent samples of their respective acquisitions. The simultaneous acquisition of GNSS signals and of signals from transmitter 2 makes it possible, at each receiver station 1a, 1b, 1c, precisely to time each signal from transmitter 2.

All the satellites of a GNSS system are synchronised with one another by a common GNSS time base, $t_{GNSS}$ (called absolute time base).

The first receiver 3 of each of the receiver stations 1x is configured to obtain the acquisition of signals $S_{1x}$ (x=a orb or c) from transmitter 2 in synchronised manner and timed by the time base $t_{61x}$ (x=a or b or c) provided by the local clock 6.

The second receiver 4 of each of the receiver stations 1x is configured to process the GNSS signals so as to perform local reconstitution, by means of processing and demodulation of the GNSS signals, of the reconstituted absolute time base $t_{GNSS-x}$ (x=a or b or c). Additionally, being synchronised by the local clock 6x, the second receiver is configured permanently to determine a value $\Delta_{1x}$ (x=a or b or c) of the time difference between the local time base $t_{61x}$ generated by the local clock 6 and the reconstituted GNSS time base $t_{GNSS-x}$.

By adding the clock difference signal $\Delta_{1a}$, $\Delta_{1b}$, $\Delta_{1c}$, the receiver station 1a, 1b, 1c is able to convert any signal $S_{1a}$, $S_{1b}$, $S_{1c}$ timed on the local time base $t_{61a}$ $t_{61b}$ $t_{61c}$ to a signal $S_{1a}$, $S_{1b}$, $S_{1c}$ timed on the reconstituted GNSS time base $t_{GNSS-a}$, $t_{GNSS-b}$, $t_{GNSS-c}$ of the GNSS system with a time $T_{1a}$, $T_{1b}$, $T_{1c}$. The signals are therefore timed in accordance with the time base $t_{GNSS}$ with accuracy reduced to the error of reconstruction when generating the time bases $t_{GNSS-a}$, $t_{GNSS-b}$, $t_{GNSS-c}$ which is minimal, and allows the assertion that the receiver stations 1a, 1b, 1c of the processing system are synchronised in time and frequency.

Each receiver station 1a, 1b, 1c transmits to the processing station 7 the signals $S_{1a}$, $S_{1b}$, $S_{1c}$, from transmitter 2 together with their reconstituted time in the time base $t_{GNSS}$ $T_{1a}$, $T_{1b}$, $T_{1c}$.

Therefore, contrary to a conventional system, the second receiver 4 does not reconstruct a local reference clock synchronised with the GNSS time base, but computes a time difference allowing conversion of the local clock $t_{61a}$, $t_{61b}$, $t_{61c}$, common to receivers 3 and 4, to an absolute GNSS time base $t_{GNSS-a}$, $t_{GNSS-b}$, $t_{GNSS-c}$.

Figure 3:
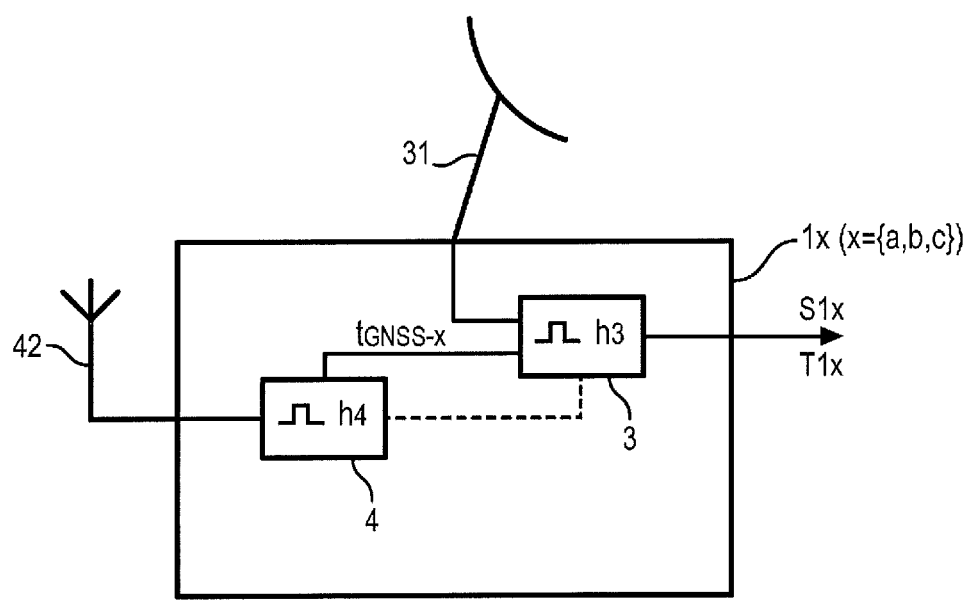
FIG. 3 illustrates a receiver station of a system for processing remote signals from a transmitter according to a conventional solution.

Within a conventional architecture, this reconstituted clock would be used to synchronise the first receiver 3. Therefore, in this type of conventional architecture, the synthesis of the clock and transfer thereof are major sources of synchronisation error in addition to the precision of reconstitution of the absolute time base $t_{GNSS-a}$, $t_{GNSS-b}$, $t_{GNSS-b}$ by receiver 4. FIG. 3 illustrates a conventional architecture in which each receiver 3, 4 has its own clock h3, h4.

On the other hand, the use of two identical receivers 3 and 4 synchronised by the same local clock, allows synchronisation error between the first and second receivers 3, 4 to be reduced to the intrinsic jitter of analogue-digital converters, this jitter being much lower than that imposed by a change in clock domain which requires regeneration of a clock signal based on GNSS signal processing and transfer thereof from one receiver to another. The precision of synchronisation of receiver 3 relative to the absolute time base is therefore essentially reduced to the precision of reconstitution of the absolute time base $t_{GNSS-a}$, $t_{GNSS-b}$, $t_{GNSS-b}$ by receiver 4.

Returning to FIG. 1, the processing station 7 comprises a processing unit 8 configured to compare all the signals $S_{1a}$, $S_{1b}$, $S_{1c}$ from transmitter 2 and timed $T_{1a}$, $T_{1b}$, $T_{1c}$ and then to determine a time difference $\Delta t1$, $\Delta t2$ between two identical portions of signal $S_{1a}$, $S_{1b}$, $S_{1c}$ between two different acquisitions.

These time differences are therefore TDOAs, differences in arrival time of one same signal from transmitter 2 and received by two geographically separate stations.

The TDOAs such as measured between stations 1a and 1b are exactly the difference in propagation times taken by the signal from transmitter 2 to reach station 1a and to reach station 1b, propagation times which are exactly determined by known physical models of movement of transmitter 2, of signal propagation from the transmitter to the receiver stations 1a and 1b, and of very precisely known geographical positions of the receiver stations and position of the transmitter 2 at the time of transmission of the signal which is the unknown remaining to be determined.

Using precise geographical coordinates of the stations, the TDOAs obtained from at least two pairs of stations during a certain measurement period, a model of movement of the transmitter 2 and a propagation model of the signals in the medium separating the transmitter 2 from the receiver stations, it is then possible to locate the transmitter precisely and to determine its pathway.

As previously indicated, the reconstituted absolute time bases $t_{GNSS-a}$, $t_{GNSS-b}$, $t_{GNSS-c}$ are considered to be identical. However, an error of absolute synchronisation may occur. This synchronisation error is reduced to a jitter error Jitter-$Err_x$ (x=a or b or c) (which is an error of difference in transfer time $T_{61a}$ to the first and second receivers 3, 4) and to the reconstruction error ($t_{GNSS\ x}-t_{GNSS}$).

Therefore, if we look at the precision of differential synchronisation Delta T between two receiver stations 1a, 1b for example, we obtain:

$$\text{Delta } T = (t_{GNSSa} + JitterErr_a) - (t_{GNSSb} + JitterErr_b) =$$
$$((t_{GNSSa} - t_{GNSS}) - (t_{GNSSb} - t_{GNSS}) + (JitterErr_a - JitterErr_b) =$$
$$(ErrRecGNSS_a - ErrRecGNSS_b) + (JitterErr_a - JitterErr_b)$$

where ErrRecGNSSa is the reconstruction error signal of GNSS time in the receiver 3 of station 1a.

Since jitter-related errors can be reduced to very low levels compared with reconstruction errors, the predominating term of the synchronisation error is the difference in reconstruction error $t_{GNSS\ a}-t_{GNSS}$.

In one embodiment of the invention, the difference in reconstruction error of GNSS time is reduced by compelling the second receiver 4 of each receiver station only to take into account a specific selection of one or more satellites among one (or more) GNSS constellations. This selection may change over time. The selection criterion may be automatically applied autonomously by each of the stations.

This selection criterion may be only to take into consideration the N satellites of the constellation received with the highest elevation, higher than a minimum value, from all the receiver stations.

In another embodiment, the second receiver 4 of GNSS signals may generate a reception quality indicator of signals from different satellites of the GNSS constellations. Under these conditions, the selection criterion of the satellites used for synchronisation is only applied to those satellites for which the reception quality indicators are higher than a threshold value for all the receiver stations. In particular, if the selection criterion is computed autonomously by each receiver station, it can be determined using information specific to the global system (geographical coordinates of each station for example), previously made available to each of the stations.

In another embodiment, the selecting of satellites to be used to reconstruct time $t_{GNSS-a}$, $t_{GNSS-b}$, X $t_{GNSS-c}$ is performed by the main station 7 which informs each of the stations thereof. This selection can be determined a priori on the basis of information available to station 7 (positions of the receiver stations and satellite ephemerides of the GNSS constellation(s) used), or on the basis of information measured by the different receiver stations. Finally, in a last embodiment, the selection mode of satellites may change over from supervised mode by station 7 to autonomous mode in particular when there is a break in connection between station 7 and one or more receiver stations.

Finally, in the event that several receiver stations are involved in the receiving of signals from the transmitter, care is taken to ensure that the selected satellites are the same for all the stations, the selection criterion of the satellites in this case then being the same for all the stations.

The invention claimed is:

1. Receiver station of a system for processing signals coming from a transmitter to be located, the receiving station being configured for acquiring signals coming from the transmitted to be located and signals coming from at least one a satellite navigation system said receiver station, comprising:
   a local clock generating a local time base;
   a first receiver configured to acquire signals coming from a transmitter to be located;
   a second receiver configured to acquire signals coming from a satellite navigation system;
   wherein the first receiver and the second receiver are synchronised by the local clock, the acquired signals being dated by said time base.

2. The receiver station according to claim 1, wherein the second receiver is further configured to demodulate signals received from the satellite navigation system to extract an absolute time base therefrom and then to determine the difference between the absolute time base and each local time base so as to resynchronise the signals from the transmitter in relation to said absolute time base.

3. The receiver station according to claim 2, wherein the first receiver is configured so that, from the difference between the absolute time base and the local time base, it dates the signals from the transmitter in relation to the absolute time base.

4. The receiver station according to claim 3, wherein the first receiver is configured to acquire portions of signals from the transmitter during a predefined period in the absolute time base, and to transmit these to a processing station together with the timings in the absolute time base.

5. The receiver station according to claim 1, wherein the satellite navigation system comprises at least one satellite constellation, each of the at least one satellite constellation comprising a plurality of satellites, and wherein the second receiver is configured to select in autonomous or supervised mode at least one satellite among the at least one of the constellations included in the satellite navigation system, the signals acquired by the second receiver being received from the selected at least one satellites.

6. The receiver station according to claim 5 wherein the selection, in autonomous mode, consists of selecting at least one satellite having an elevation higher than a threshold value, in a visible constellation.

7. The receiver station according to claim 5, wherein the second receiver is configured to generate a reception quality indicator of signals received from one or more satellite(s) of a visible constellation, the selection in autonomous mode consisting of selecting at least one satellite for which the quality indicator is higher than a threshold value.

8. The receiver station according to claim 5, wherein the second receiver is configured to receive information, in supervised mode, on the selection of one or more satellites sent by a processing station.

9. The receiver station according to claim 8, wherein the second receiver is configured to generate a quality indicator of signals received from one or more satellite(s) in a visible constellation, the quality indicator being transmitted to the processing station, the information on the selection of one or more satellite(s) being determined from this quality indicator.

10. System for processing signals from a transmitter to be located, said system for processing comprising:
    at least two receiver stations, wherein each of the at least two receiver stations includes;
    a local clock generating a local time base;
    a first receiver configured to acquire signals coming from a transmitter to be located;
    a second receiver configured to acquire signals coming a satellite navigation system, the first reciever and the second receiver being synchronised by the local clock, the acquired signals being dated by said time base;
    a processing station configured to process signals transmitted and timed by the receiver stations.

11. The processing system according to claim 10, wherein the second receiver of each of the at least two receiver stations is configured to select, in autonomous mode, at least one satellite within the visibility of each of the stations at an elevation higher than a threshold value.

12. The processing system claim 10, wherein the processing station comprises a processing unit configured to compute the arrival differences and/or in time and/or frequency between portions of identical signals from the transmitter, between the at least two receiver stations.

13. The processing system of claim 10, wherein the processing unit is further configured so that, from the computed arrival differences, it can determine a location of the transmitter from which the acquired signals were received.

14. The processing system of claim 10, wherein the processing station is one of the at least two receiver stations.

* * * * *